United States Patent
Benson et al.

(10) Patent No.: US 7,285,139 B2
(45) Date of Patent: *Oct. 23, 2007

(54) BATTERY CONSTRUCTED WITH INDEXING CONVEYOR SYSTEM AND CONTINUOUS TERMINAL CHAIN

(75) Inventors: Morgan Rey Benson, Indianapolis, IN (US); Bruce Everett Lasley, Fishers, IN (US); Robert Thomas Wendling, Pendleton, IN (US)

(73) Assignee: Enerdel, Inc., Indianapolis, IN (US)

( * ) Notice: Subject to any disclaimer, the term of this patent is extended or adjusted under 35 U.S.C. 154(b) by 176 days.

This patent is subject to a terminal disclaimer.

(21) Appl. No.: 10/957,998

(22) Filed: Oct. 4, 2004

(65) Prior Publication Data

US 2005/0198813 A1    Sep. 15, 2005

Related U.S. Application Data

(63) Continuation of application No. 10/013,220, filed on Dec. 10, 2001, now Pat. No. 6,800,100.

(51) Int. Cl.
*H01M 10/04* (2006.01)

(52) U.S. Cl. .................................. 29/623.1; 29/623.2

(58) Field of Classification Search ................ 429/178, 429/152, 162; 29/623.1–623
See application file for complete search history.

(56) References Cited

U.S. PATENT DOCUMENTS

| 4,342,342 A | 8/1982 | Wheadon |
| 4,664,993 A * | 5/1987 | Sturgis et al. ............... 429/178 |
| 5,516,221 A * | 5/1996 | Lake ........................ 400/621.1 |
| 6,368,743 B1 | 4/2002 | Guerin et al. |
| 6,406,815 B1 | 6/2002 | Sandberg et al. |
| 6,413,668 B1 | 7/2002 | Sandberg et al. |
| 6,800,100 B2 * | 10/2004 | Benson et al. .............. 29/623.1 |

* cited by examiner

*Primary Examiner*—Susy Tsang-Foster
*Assistant Examiner*—Alix Echelmeyer
(74) *Attorney, Agent, or Firm*—Howard & Howard Attorneys, P.C.

(57) ABSTRACT

A method of constructing a battery using a control unit to cause battery components to be drawn through an automated conveyor system and between indexed positions on the conveyor system is provided. Positive terminals for a battery are attached to a first carrier strip having indexing apertures. Negative terminals for a battery are attached to a second carrier strip having indexing apertures. Spools, controlled by control unit, are engaged in the indexing apertures of the first and second carrier strips and rotated for movement of carrier strips and terminals through indexed construction positions.

5 Claims, 3 Drawing Sheets

BATTERY CONSTRUCTED WITH INDEXING CONVEYOR SYSTEM AND CONTINUOUS TERMINAL CHAIN

CROSS REFERENCE TO RELATED APPLICATION:

The present application is a continuation application of U.S. application Ser. No. 10/013,220 filed on Dec. 10, 2001 now U.S. Pat. No. 6,800,100.

BACKGROUND OF THE INVENTION

1. Technical Field

The present invention relates to processes for constructing and indexing storage batteries.

2. Description of the Related Art

Current construction methods of storage batteries involve using fixtures, human labor, and some system automation to build a battery from its component parts. U.S. Pat. No. 4,342,342 issued to Wheadon shows battery plates prepared and cured on a battery assembly line, but then removed from the assembly line, to be later assembled into a complete battery. These types of production methods are disadvantageous for several reasons. One of the problems is that they are inefficient because of the amount of labor involved and a complete battery can not be produced without extensive human labor and oversight. Also, there exists no indexing system, which again, slows the process of creating a complete battery by not having an automatic system to more quickly move a battery under construction from one process to the next process. Another problem is that these methods are costly because of the amount of time and human labor and oversight needed to build a battery wherein the construction process is not indexed automatically such that a battery under construction can be moved automatically from one process to the next.

There is therefore a need for an improved process of building batteries that minimizes or eliminates one or more of the problems set forth above.

SUMMARY OF THE INVENTION

It is an object of the present invention to provide a solution to one or more of the above mentioned problems. In one aspect of the invention, an automatic conveyor system controlled by a control unit is provided to construct a storage battery. This system includes spools in which the carrier strip is engaged such that the terminals, which are attached to the carrier strip, are drawn forward through the construction process stages. This also allows indexing of each battery under construction by an indexing unit. The carrier strip is engaged in the spools via apertures in the carrier strip. One advantage of this system is the amount of manual labor required to monitor the batteries through their construction process, as well as constructing the batteries themselves, is reduced because the batteries can be constructed and indexed by the automated system.

According to a first aspect of the invention, a method is provided, involving the steps of providing a positive terminal for a battery wherein the positive terminal is attached to a first carrier strip having indexing apertures, providing a negative terminal for a battery wherein the negative terminal is attached to a second carrier strip having indexing apertures, and rotating spools engaged in the indexing apertures of the first and second carrier strips to allow movement.

In another aspect of the invention, positive terminals and negative terminals are attached in a continuous chain, positive terminal to positive terminal and negative terminals to negative terminals. One advantage of this configuration is that it further speeds the construction process in two ways. First, reducing the amount of empty space between batteries under construction reduces the amount of time needed to move a battery from one construction stage to the next construction stage. Second, reducing the amount of empty space allows numerous batteries through a process simultaneously (i.e. several batteries can be in an extraction chamber simultaneously).

An apparatus for indexing a battery through the construction process is also presented.

Other features, objects, and advantages will become apparent to one of ordinary skill from the following detailed description and accompanying drawings illustrating the invention by way of example but not by way of limitation.

DETAILED DESCRIPTION OF THE PREFERRED EMBODIMENTS

Figure 1:
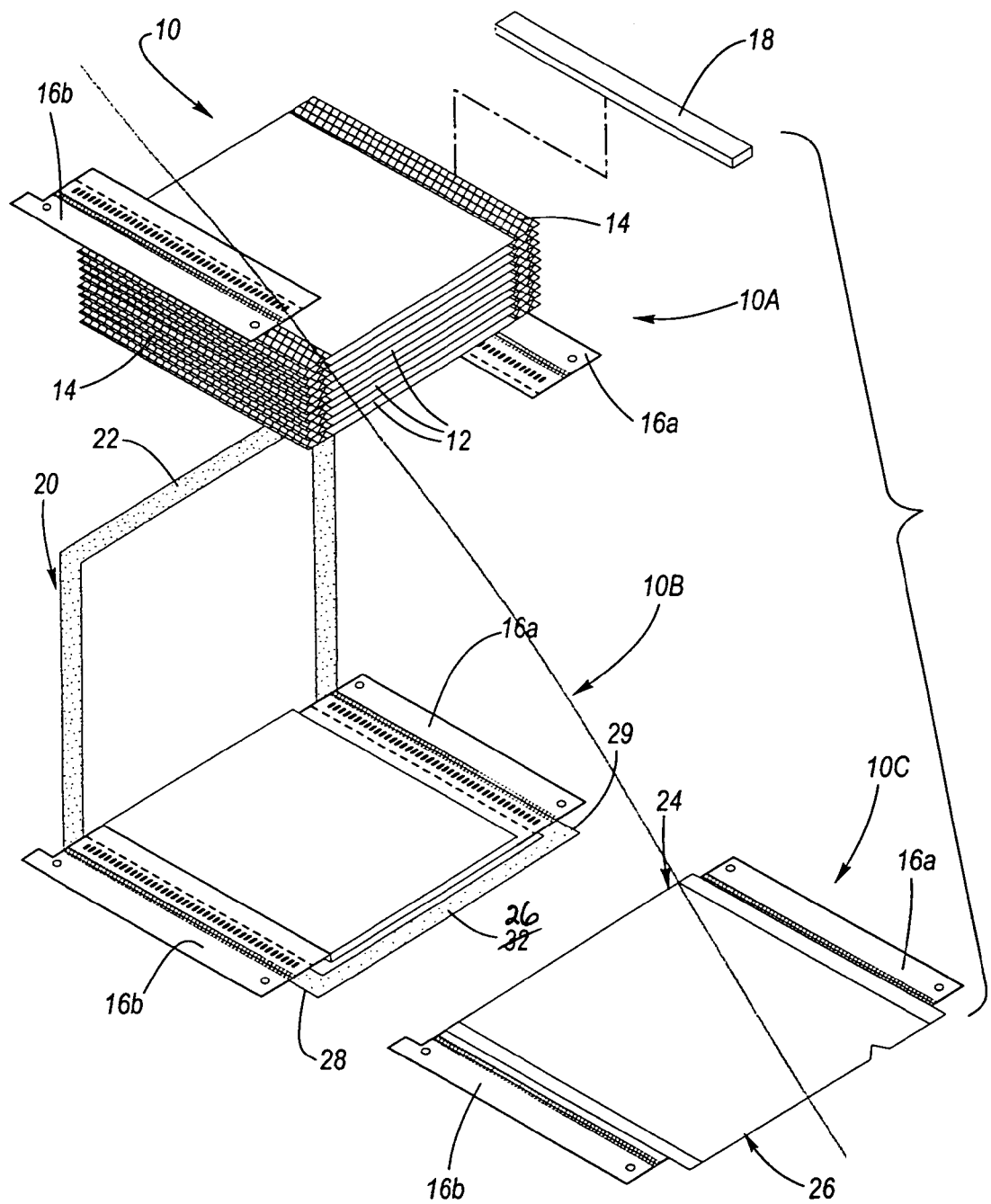
FIG. 1 is a perspective view of a battery of a type that can be indexed by a process according to the invention.

Referring now to the drawings wherein like reference numerals are used to identify identical components in the various views, FIG. 1 illustrates a storage battery 10, in various stages of construction, all or part of which may be constructed using the improved automated system. To fully appreciate the advantages of the present invention, a brief description of the product made thereby, and its component parts will be set forth. The battery 10 may be connected with other batteries or may be used as an individual unit. It may be used for portable or stationary electrical and/or electronic devices. An exploded view of an initial phase of construction is designated $10_A$, an intermediate phase of construction is designated $10_B$, and a completed phase of construction is designated $10_C$. FIG. 1 shows a plurality of bicells 12 with exposed conductive grids 14, positive and negative terminals $16_a$, $16_b$, a cover strip 18, and packaging 20 with hot melt adhesive layer 22 along the edges 26, 28, 29 of packaging.

Bicells 12 may comprise conventional bicells known to those of ordinary skill in the art, for example as seen by reference to U.S. Pat. No. 6,063,519, issued to Barker, et al., hereby incorporated by reference. In the illustrated embodiment, a plurality of bicells 12 are connected in a parallel electrical relationship. Exposed grids 14 are current carriers.

Cover strip 18 is made of the same material as the corresponding terminal (positive or negative) $16_a$, $16_b$ and is placed above grids 14 or below grids 14, dependent upon whether terminals $16_a$, $16_b$ are welded above or below grids 14. Use of cover strip 18 aids in ultrasonic welding of exposed grids 14 to terminals $16_a$, $16_b$ because it protects the relatively fragile exposed grids 14 during the welding.

Bicells 12 are enclosed in packaging 20. Packaging 20 may comprise a single sheet which is folded to enclose bicells 12. Packaging 20 may be a type of laminated, aluminized flexible material which contains four layers. The outside layer exposed to the environment is an electrical insulating material, for example, a polyester. The next underlying layer is metallic, for example, aluminum. This metallic layer reduces or eliminates the amount of moisture outside of packaging 20 to which the battery is exposed (i.e., provides a bidirectional moisture barrier). The third layer is of the same material as the outside layer. The fourth layer, layer 22, comprises an adhesive such as a conventional sealing hot melt adhesive, for example, ethylene acrylic acid (EAA). In one embodiment, a part of a sheet of packaging 20 is placed under battery 10 and a remaining part of the packaging 20 is folded over bicells 12 such that hot melt adhesive layer 22 may come in contact with itself at a first end 28, a second end 29, and the edge 26 opposite the packaging fold 24.

In the illustrated embodiment shown in FIG. 1, terminal $16_b$ is placed above the plurality of bicells 12, while terminal $16_a$ is placed below the plurality of bicells 12. In a preferred embodiment, terminals $16_a$, $16_b$ are located in the same plane (either both placed above the plurality of bicells 12 or placed below the plurality of bicells 12). This arrangement is preferred because it eases manufacturing, as will be described in detail below. Overall, automatically moving battery 10 through its various stages of construction, indexing battery 10 as battery 10 passes through construction stages, presents manufacturing benefits and challenges. The invention overcomes these and other problems.

Figure 2:
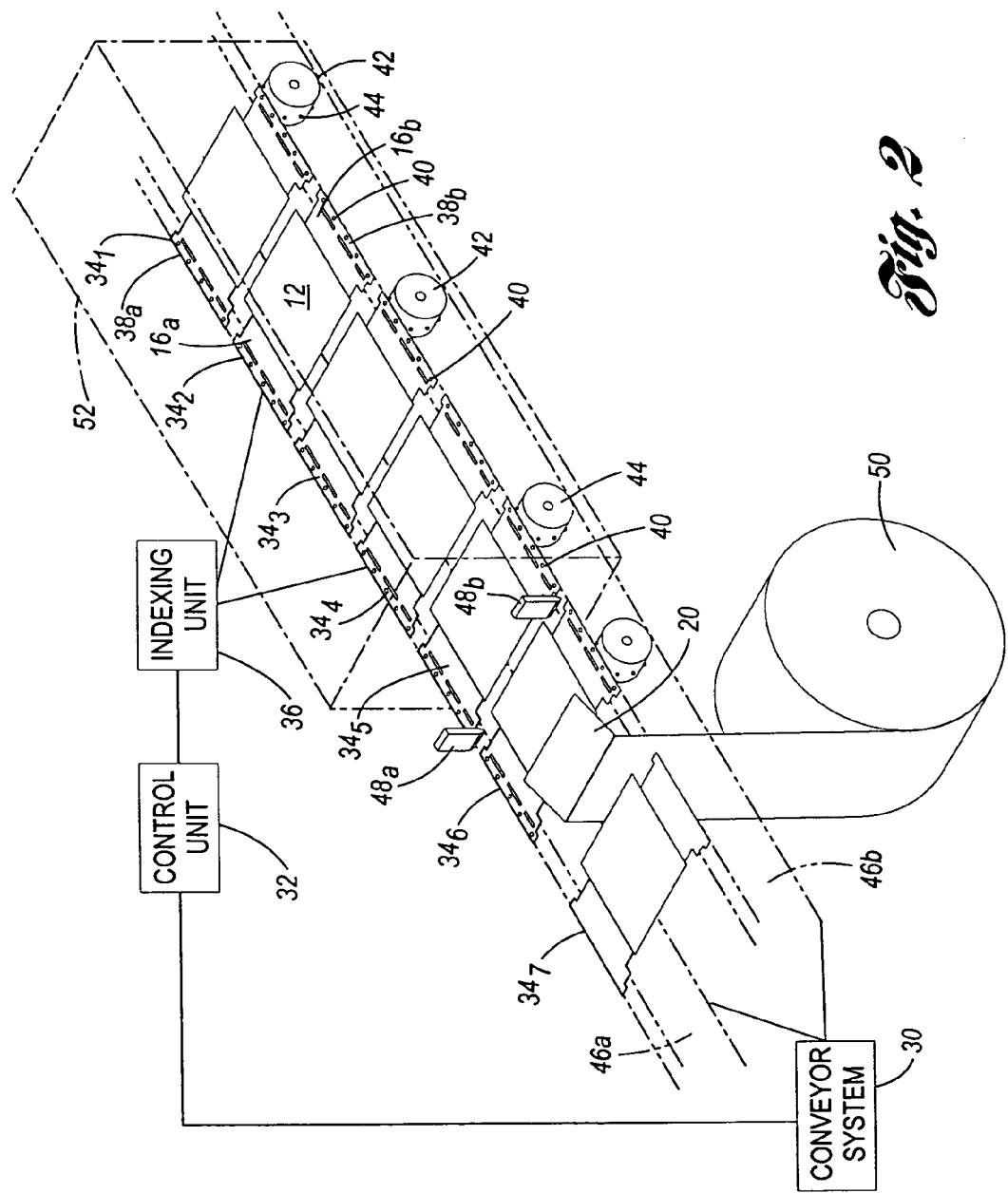
FIG. 2 is a perspective view of a preferred embodiment for indexing for batteries according to the invention.

FIG. 2 illustrates an embodiment of an automatic indexing conveyor system 30. Conveyor system 30 includes a control unit 32, indexed construction positions $34_n$ (where n is an integer ranging from one to seven in the illustrated embodiment), an indexing unit 36, carrier strips 38 that may include apertures 40, spools 42 that may include radial members 44, conveyor belts $46_a$, $46_b$, cutters $48_a$, $48_b$, a reel 50 of packaging 20 and an extraction chamber 52.

Control unit 32 controls conveyor system 30. Conveyor system 30 moves each positive terminal $16_a$ and each negative terminal $16_b$ pre-determined distances to indexed construction positions $34_n$. Control unit 32 may control the pre-determined distances to which the terminals $16_a$, $16_b$ are moved.

Indexing unit 36 is controlled by control unit 32. Indexing unit 36, controlled by control unit 32, may control the pre-determined distances to which terminals $16_a$, $16_b$ are moved. Indexing unit 36 allows battery 10 to be located and indexed at each position $34_n$ of construction.

Carrier strips $38_a$, $38_b$ draw terminals $16_a$, $16_b$ through indexing construction positions $34_n$. Positive terminal $16_a$ is attached to carrier strip $38_a$ and negative terminal $16_b$ is attached to carrier strip $38_b$. As carrier strips $38_a$, $38_b$ are drawn through positions $34_n$, terminals $16_a$, $16_b$ which are attached to carrier strips $38_a$, $38_b$, respectively, are also drawn through positions $34_n$.

Carrier strips $38_a$, $38_b$ are drawn through positions $34_n$ by apertures 40 in carrier strips $38_a$, $38_b$ engaged in spools 42. Apertures 40 may be circular or elliptical in shape. Each aperture 40 may be a uniform distance away from the adjacent apertures 40. The number of spools 42 may be varied. Spools 42 may be the same size. Spools 42 may be spherical in shape. Spools 42 may include radial members 44. Radial members 44 may engage apertures 40 such that as spool 42 rotates, each individual aperture 40 is fed over a radial member 44. Rotation of spools 42 is controlled by control unit 32. This rotation moves carrier strips $38_a$, $38_b$ through conveyor system 30, thereby, moving terminals $16_a$, $16_b$. In the illustrated embodiment, bicells 12 have been placed in electrical connection with positive terminal $16_a$ and negative terminal $16_b$. Further, bicells 12 may be ultrasonically welded to terminals $16_a$, $16_b$. As terminals $16_a$, $16_b$ are drawn forward, all attached accompanying parts of battery 10, including bicells 12 and/or packaging 20 are also drawn forward through conveyor system 30.

Conveyor belts $46_a$, $46_b$ may be located between spools 42 and carrier strips $38_a$, $38_b$ to aid in drawing terminals $16_a$, $16_b$ through indexed construction positions $34_n$. Conveyor belts $46_a$, $46_b$ may include indentations or apertures (not shown) to aid in smoother movement of carrier strips $38_a$, $38_b$.

Each set of terminals $16_a$, $16_b$ may be attached to both the previous set of terminals and the subsequent set of terminals such that terminals $16_a$, $16_b$ are in a continuous chain. A first positive terminal $16_a$ may be attached to a second positive terminal, which in turn is attached to a third positive terminal, thereby creating the continuous chain. Likewise, a first negative terminal $16_b$ may be attached to a second negative terminal, which in turn is attached to a third positive terminal, thereby creating a continuous chain. This is advantageous in that more battery component sets can be moved through stages of the construction process more quickly. For example, several index construction positions $34_{1-4}$ can be located within extraction chamber 52 simultaneously. Cutters $48_a$, $48_b$ are provided to sever or separate the sets of terminals $16_a$, $16_b$ connected to adjacent terminals $16_a$, $16_b$. Terminals $16_a$, $16_b$ must be separated from adjacent terminals $16_a$, $16_b$ to finish construction process of a single battery 10.

Reel 50 of packaging material 20 is provided to aid in construction of battery 10. Sheet of packaging 20 from reel 50 is unrolled a pre-determined amount. This action is controlled by control unit 32. Packaging 20 is moved over battery components such that bicells 12 are covered. Packaging 20 is cut by a cutter (not shown) a pre-determined amount such that enough packaging 20 material is left so packaging 20 is folded by a folding mechanism (not shown) such that bicells 12 are enclosed in an envelope of packaging. Control unit 32 controls the packaging cutter and folding mechanism.

Figure 3:
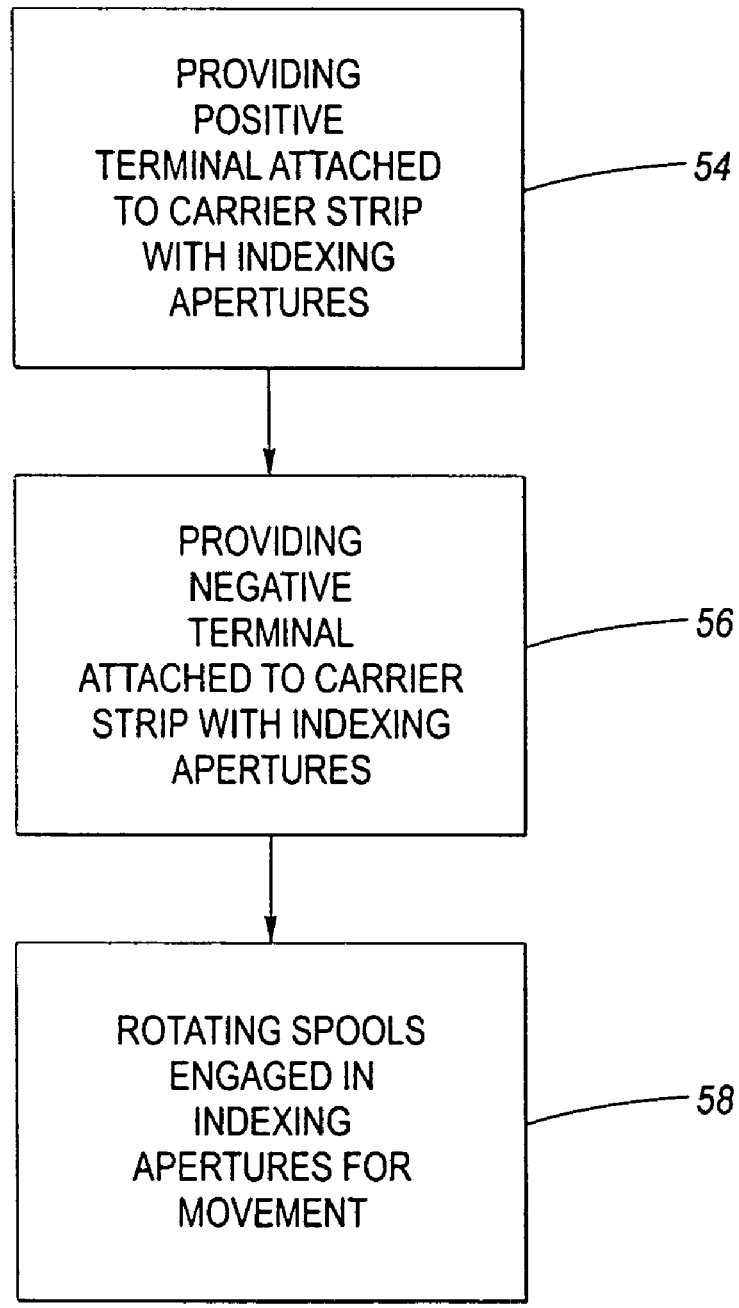
FIG. 3 is a simplified plan of the method according to the invention.

Referring now to FIGS. 2 and 3, the operation of the automated indexing, construction mechanism is illustrated in one embodiment. In step 54, a positive terminal $16_a$ attached to carrier strip $38_a$ having apertures 40 is provided. In step 56, a negative terminal $16_b$ attached to carrier strip $38_b$ having apertures 40 is provided. Bicells 12 may be placed on terminals $16_a$, $16_b$. Additionally, exposed grids 14 of bicells 12 may be ultrasonically welded to terminals $16_a$, $16_b$. In step 58, spools 42 engaged in apertures 40 of carrier strips $38_a$, $38_b$ rotate and move carrier strips $38_a$, $38_b$ (and attached terminals $16_a$, $16_b$ and bicells 12) through conveyor system 30, and indexed construction positions $34_n$. Rotating spools 42, controlled by control unit 32, first move carrier strips $38_a$, $38_b$, terminals $16_a$, $16_b$ and bicells 12 to indexed construction position $34_1$. At position $34_1$, carrier strips $38_a$, $38_b$, terminals $16_a$, $16_b$, and bicells 12 are moved through extraction chamber 52. The process of extraction involves removal of a plasticizer to create micropores, which are subsequently backfilled with an electrolyte. Extraction involves exposing bicells 12 to a fluid, such as dry, heated air. This can be accomplished in a controlled environment (such as a glove box or drying oven or other extraction chamber) or in a non-controlled environment. Extraction processes are known in the art.

Next, conveyor system 30, controlled by control unit 32, moves sets of carrier strips $38_a$, $38_b$, terminals $16_a$, $16_b$, and bicells 12 to indexed construction position $34_5$. At indexed construction position $34_5$, control unit 32 causes terminals $16_a$, $16_b$ to be cut by cutters $48_a$, $48_b$, separating each set of terminals $16_a$, $16_b$ from the preceding and subsequent sets of terminals $16_a$, $16_b$. Cutters $48_a$, $48_b$ are controlled by control unit 32.

Next, conveyor system 30, controlled by control unit 32, moves sets of carrier strips $38_a$, $38_b$, terminals $16_a$, $16_b$, and bicells 12 through indexed construction position $34_6$. At index construction position $34_6$, control unit 32 causes a sheet of packaging 20 to be unrolled from a reel 50 a pre-determined amount. Packaging material 20 is moved over battery components such that bicells 12 are covered. Packaging sheet 20 is cut by a cutter (not shown) a predetermined amount, leaving enough material that bicells 12 are covered underneath. Packaging 20 is folded by a folding mechanism (not shown) such that bicells 12 are enclosed in an envelope of packaging 20.

Then conveyor system 30, controlled by control unit 32, moves sets of carrier strips $38_a$, $38_b$, terminals $16_a$, $16_b$, and bicells 12 to indexed construction position $34_7$. At position $34_7$ carrier strips $38_a$, $38_b$ are removed from terminals $16_a$, $16_b$.

In another embodiment, battery 10 components entering extraction chamber 52 also include packaging 20 which envelops bicells 12 as described above. Packaging 20 has been cut by a cutter (not shown) at fold 24. Sides 28, 29 of packaging 20 may have been sealed with a heated platens. This results in two sides 24, 26 of packaging 20 open for fluid (heated air) of the extraction chamber 52 to flow over bicells 12.

While the invention has been disclosed in terms of specific embodiments thereof, it is not intended to be limited thereto, but rather only to the extent set forth hereafter in the claims which follow.

The invention claimed is:

1. A method, comprising the steps of:
   (A) providing a positive terminal for a battery wherein said positive terminal is attached to a first carrier strip having indexing apertures,
   (B) providing a negative terminal for a battery wherein said negative terminal is attached to a second carrier strip having indexing apertures,
   (C) rotating spools engaged in said indexing apertures for movement of a battery through an extraction chamber, and providing said spools with radial members engaged in said indexing apertures; and
   (D) removing said first carrier strip from said positive terminal and removing said second carrier strip from said negative terminal.

2. The method of claim 1, wherein said positive terminal is a first positive terminal, futher comprising attaching a second positive terminal to said first positive terminal.

3. The method of claim 2, further comprising the step of severing said first positive terminal from said second positive terminal.

4. The method of claim 1, further comprising the steps of:
   (A) placing on said positive terminal and said negative terminal a plurality of bicells; and
   (B) welding said plurality to said positive terminal and said negative terminal.

5. The method of claim 1, wherein said providing said positive terminal step includes the substep of providing a packaging having a sealed pair of opposing sides and an open pair of opposing sides.

* * * * *